US012681293B2

(12) United States Patent　　　(10) Patent No.:　US 12,681,293 B2
Zhou　　　　　　　　　　　　　　(45) Date of Patent:　　Jul. 14, 2026

(54) PROJECTION SYSTEM AND METHOD OF OPERATING THE SAME

(71) Applicant: UNITED MICROELECTRONICS CORP., Hsinchu (TW)

(72) Inventor: Zhi-Biao Zhou, Singapore (SG)

(73) Assignee: UNITED MICROELECTRONICS CORP., Hsinchu (TW)

( * ) Notice: Subject to any disclaimer, the term of this patent is extended or adjusted under 35 U.S.C. 154(b) by 367 days.

(21) Appl. No.: 18/386,619

(22) Filed: Nov. 3, 2023

(65) Prior Publication Data

US 2025/0138304 A1　　May 1, 2025

(30) Foreign Application Priority Data

Oct. 25, 2023　(TW) ................................. 112140850

(51) Int. Cl.
　　G02B 26/10　　　　(2006.01)
　　G02B 26/08　　　　(2006.01)
(52) U.S. Cl.
　　CPC ....... G02B 26/101 (2013.01); G02B 26/0816 (2013.01); G02B 26/0875 (2013.01)
(58) Field of Classification Search
　　CPC ... G02B 26/0875; G02B 26/10; G02B 26/108
　　USPC ............................................. 359/197.1, 210.1
　　See application file for complete search history.

(56) References Cited

U.S. PATENT DOCUMENTS

| | | | |
|---|---|---|---|
| 7,252,394 B1 | 8/2007 | Fu | |
| 7,517,096 B2 * | 4/2009 | Park ...................... | G03B 21/28 |
| | | | 353/94 |
| 7,826,118 B2 * | 11/2010 | Prudnikov ............. | G02B 27/48 |
| | | | 359/216.1 |
| 10,928,716 B2 * | 2/2021 | Sakurai ................... | G02B 5/208 |
| 2009/0073525 A1 * | 3/2009 | Tateiwa ................... | G09G 3/02 |
| | | | 359/201.1 |
| 2012/0050444 A1 * | 3/2012 | Sakai ................. | G02B 27/0031 |
| | | | 347/124 |
| 2013/0188161 A1 * | 7/2013 | Kajiyama ............ | G02B 3/0037 |
| | | | 355/55 |
| 2016/0313567 A1 * | 10/2016 | Kurashige .............. | G02B 26/10 |
| 2019/0227318 A1 | 7/2019 | Trail et al. | |
| 2020/0004117 A1 * | 1/2020 | Lyubarsky ........... | G03B 21/147 |
| 2020/0201189 A1 * | 6/2020 | Lin ...................... | G02B 26/105 |
| 2021/0278542 A1 * | 9/2021 | Murakami ............. | G01S 17/89 |

(Continued)

FOREIGN PATENT DOCUMENTS

KR　　　20200063687 A　　6/2020

*Primary Examiner* — Wyatt A Stoffa
*Assistant Examiner* — Seth D Moser
(74) *Attorney, Agent, or Firm* — WPAT, PC

(57)　　　　　　　ABSTRACT

A projection system is provided. The projection system includes at least one micro LED line and a scan optical system. The micro LED line is configured for emitting lights with a changing frequency of X times per second. The scan optical system is disposed at a downstream side of the at least one micro LED line. The scan optical system is configured to scan the lights emitted from the micro LED line with a scan rate of M seconds per scan and to project images formed of the lights to corresponding positions on a target projection plane. The projection system has a horizontal resolution of N lines. A total number n of the at least one micro LED line is smaller than N. Also, $X = M * (N/n)$.

19 Claims, 14 Drawing Sheets

(56) References Cited

U.S. PATENT DOCUMENTS

| 2021/0335165 | A1* | 10/2021 | Pappas | ................ | G09G 3/2014 |
| 2022/0128667 | A1* | 4/2022 | Hu | ...................... | G02B 26/108 |

* cited by examiner

100

Y
Z → X

110

B  B'

110

Z
Y → X

112

130

100A

110

100B

110

PROJECTION SYSTEM AND METHOD OF OPERATING THE SAME

This application claims the benefit of Taiwan application Serial No. 112140850, filed on Oct. 25, 2023, the subject matter of which is incorporated herein by reference.

TECHNICAL FIELD

This disclosure relates to a projection system and a method of operating the same. More particularly, the disclosure relates to a projection system having micro light emitting diodes (micro LEDs) and a method of operating the same.

BACKGROUND

Light emitting diodes (LEDs) have been widely used in various optical applications, such as lighting, displays, projectors, and the like. Decreasing size of the LEDs is beneficial in many aspects. Take a projection system for example. In the same area, a total number of the LEDs can be increased with the reduction of LED size, and thus a resolution can be increased. As such, micro LEDs have become the mainstream of the related field, and smaller size of and smaller distance between the micro LEDs have been aspired. Nevertheless, the dense small micro LEDs are hard to repaired or replaced. Typically, redundant micro LEDs provided for soft repair must be arranged in pixels to compensate for the damaged micro LEDs so as to prevent destruction of the pixels. Soft repair efficiency is much higher than hard repair. However, a large number of redundant micro LEDs must be provided, and those redundant micro LEDs have high production cost and occupy pixel space so that pixels cannot be shrunk. In addition, the image quality of soft repair is not as good as that of hard repair. Nevertheless, hard repair operation is complex, inefficient, and costly. Furthermore, smaller micro LEDs may suffer problems, such as low manufacturing efficiency, high process cost, and so on.

SUMMARY

This disclosure is directed to mitigate at least some problems as described above.

According to some embodiments, a projection system is provided. The projection system comprises at least one micro LED line and a scan optical system. The micro LED line is configured for emitting lights with a changing frequency of X times per second. The scan optical system is disposed at a downstream side of the micro LED line. The scan optical system is configured to scan the lights emitted from the micro LED line with a scan rate of M seconds per scan and to project images formed of the lights to corresponding positions on a target projection plane. The projection system has a horizontal resolution of N lines. A total number n of the at least one micro LED line is smaller than N. Also, X=M*(N/n).

According to some embodiments, a method of operating a projection system is provided. The method comprises following steps. First, lights are emitted with at least one micro LED line of the projection system at a changing frequency of X times per second. Then, the lights emitted from the micro LED line are scanned with a scan rate of M seconds per scan and images formed of the lights are projected to corresponding positions on a target projection plane with a scan optical system of the projection system.

The projection system has a horizontal resolution of N lines. A total number n of the at least one micro LED line is smaller than N. Also, X=M*(N/n).

Figure 1A:
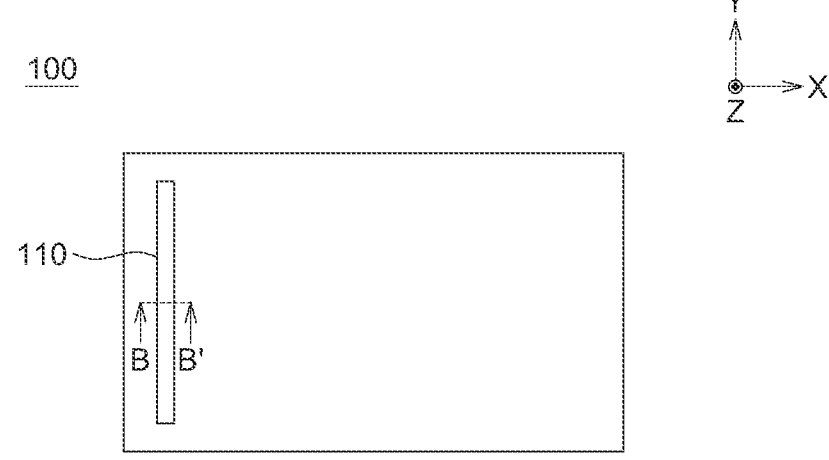
FIGS. 1A-1C illustrate a structure of an exemplary projection system of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Various embodiments will be described more fully hereinafter with reference to accompanying drawings. The description and the drawings are provided for illustrative only, and not intended to result in a limitation. For clarity, the elements may not be drawn to scale. In addition, some elements and/or reference numerals may be omitted from some drawings. It is contemplated that the elements and features of one embodiment can be beneficially incorporated in another embodiment without further recitation.

Figure 1B:
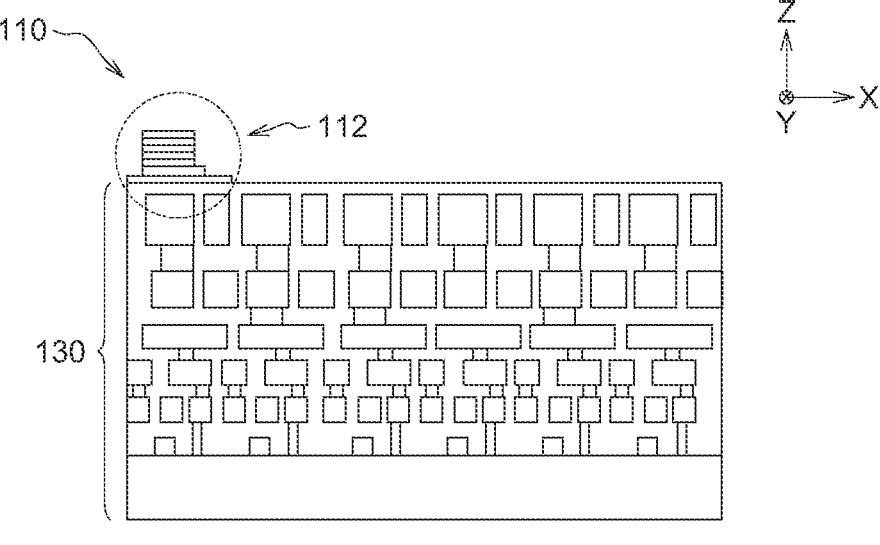
Figure 1C:
Figure 1C:
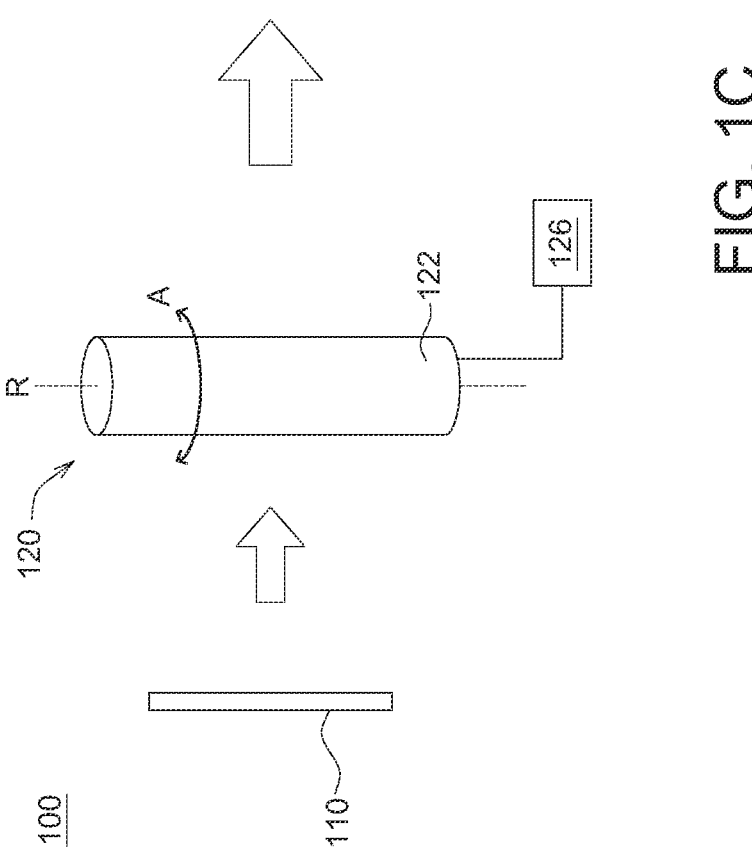
Figure 2:
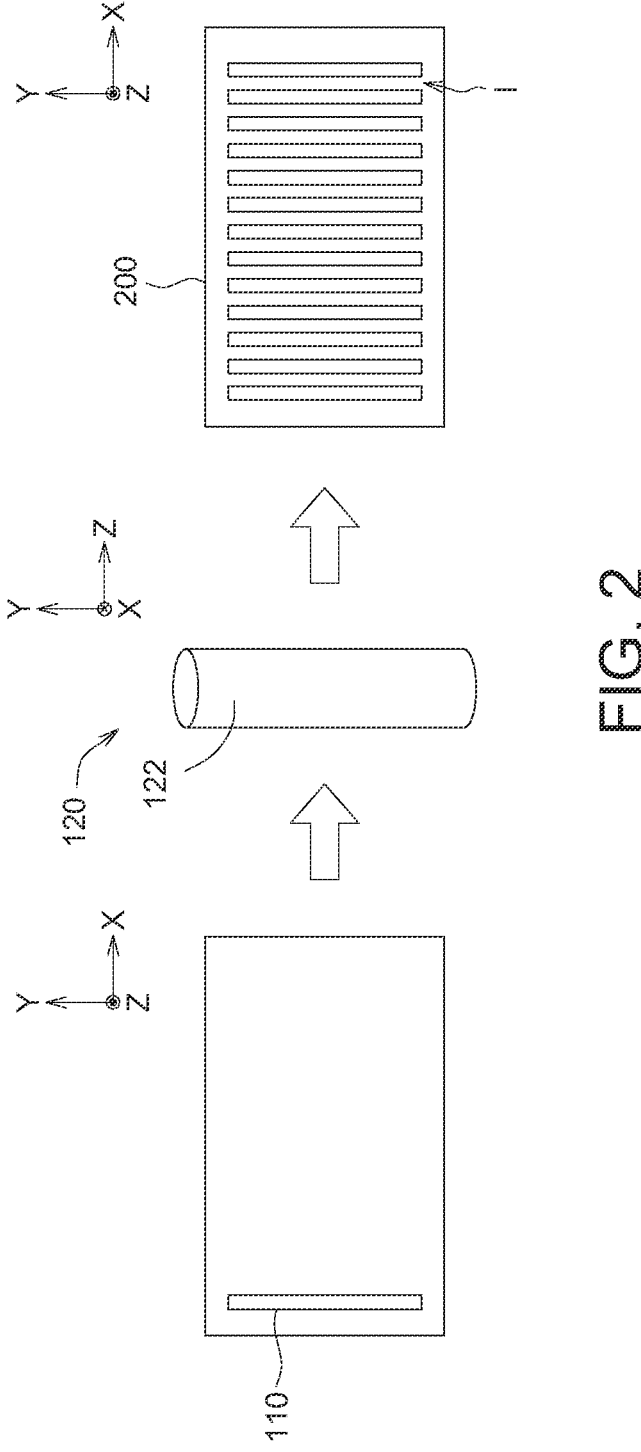
FIG. 2 illustrates functions of the projection system of the disclosure.

Referring to FIGS. 1A-1C, a structure of an exemplary projection system 100 is shown, wherein FIG. 1B shows a cross section along B-B' line in FIG. 1A. The projection system 100 comprises at least one micro LED line 110 and a scan optical system 120. The micro LED line 110 is configured for emitting lights with a changing frequency of X times per second. The scan optical system 120 is disposed at a downstream side of the micro LED line 110. The scan optical system 120 is configured to scan the lights emitted from the micro LED line 110 with a scan rate of M seconds per scan and to project images formed of the lights to corresponding positions on a target projection plane 200, as shown in FIG. 2. The projection system has a horizontal resolution of N lines. A total number n of the at least one micro LED line 110 is smaller than N. Also, X=M*(N/n).

Specifically, the micro LED line 110 emitting lights for forming one picture at different times, and the lights will be projected one by one to different positions on the target projection plane 200 to form a plurality of images I. In this way, a complete picture can be formed even though the total number n of the at least one micro LED line 110 is smaller than the horizontal resolution N.

Figure 3:
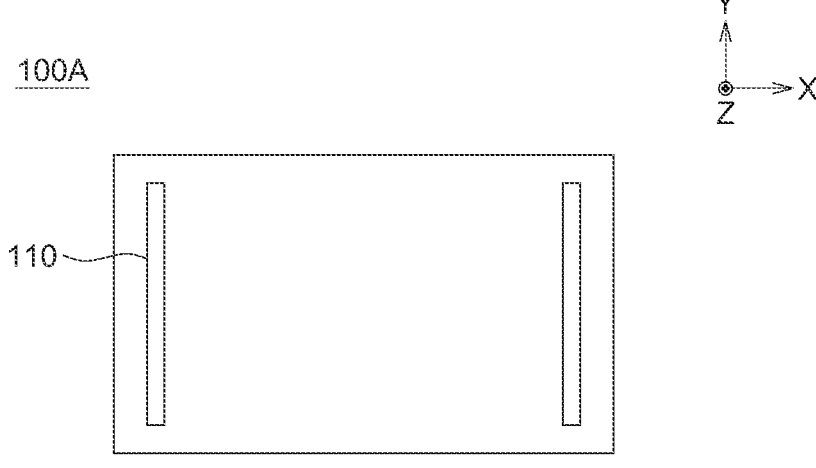
FIG. 3 to FIG. 8 illustrate structures of other exemplary projection systems of the disclosure.
Figure 4:
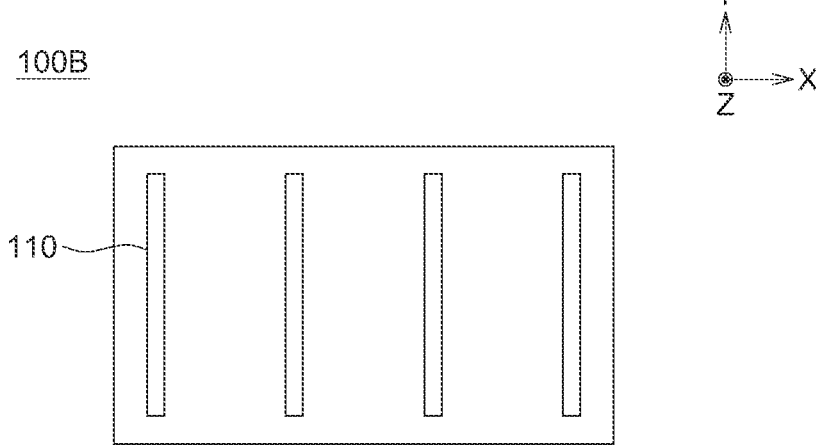

The total number n of the at least one micro LED line 110 in the projection system 100 can be equal to or larger than 1. For example, the projection system 100 of FIGS. 1A-1C has only one micro LED line 110. FIG. 3 shows another exemplary projection system 100A, which comprises two micro LED lines 110. The two micro LED lines 110 can be located near edges, respectively, but not limited thereto. FIG. 4 shows still another exemplary projection system 100B, which comprises four micro LED lines 110. It is understood that a projection system of the disclosure can comprise more micro LED lines, such as but not limited to N/2 micro LED lines, as long as the total number n is smaller than N. When the total number n of the at least one micro LED line is equal to or larger than 2, the micro LED lines can have a pitch from 10 μm to 1 cm. According to some embodiments, the micro LED lines are disposed equidistantly. The pitch of the micro LED lines 110 of the disclosure can be 5 times to 10,000 times the pitch of the micro LED lines in an ordinary projection system. As such, a large blank space is left on at least one side of the micro LED line 110, and this facilitates replacement of a damaged micro LED line 110, or repair by placing a new micro LED line 110 directly next to a damaged micro LED line 110. In such a condition, hard repair does not have the problems of complex, inefficient, and costly as in the conventional hard repair.

Figure 5:
Figure 5:
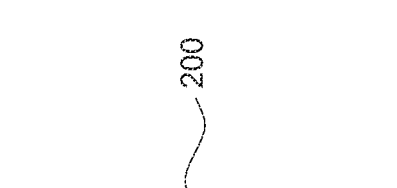
Figure 5:
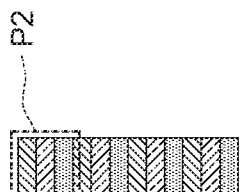
Figure 5:
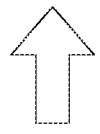
Figure 5:
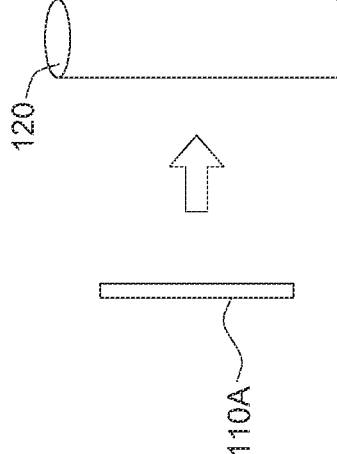
Figure 5:
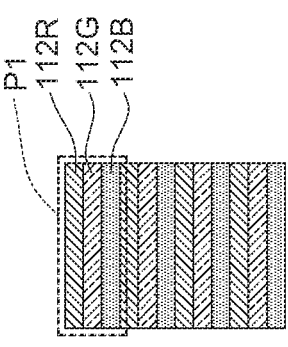
Figure 6:
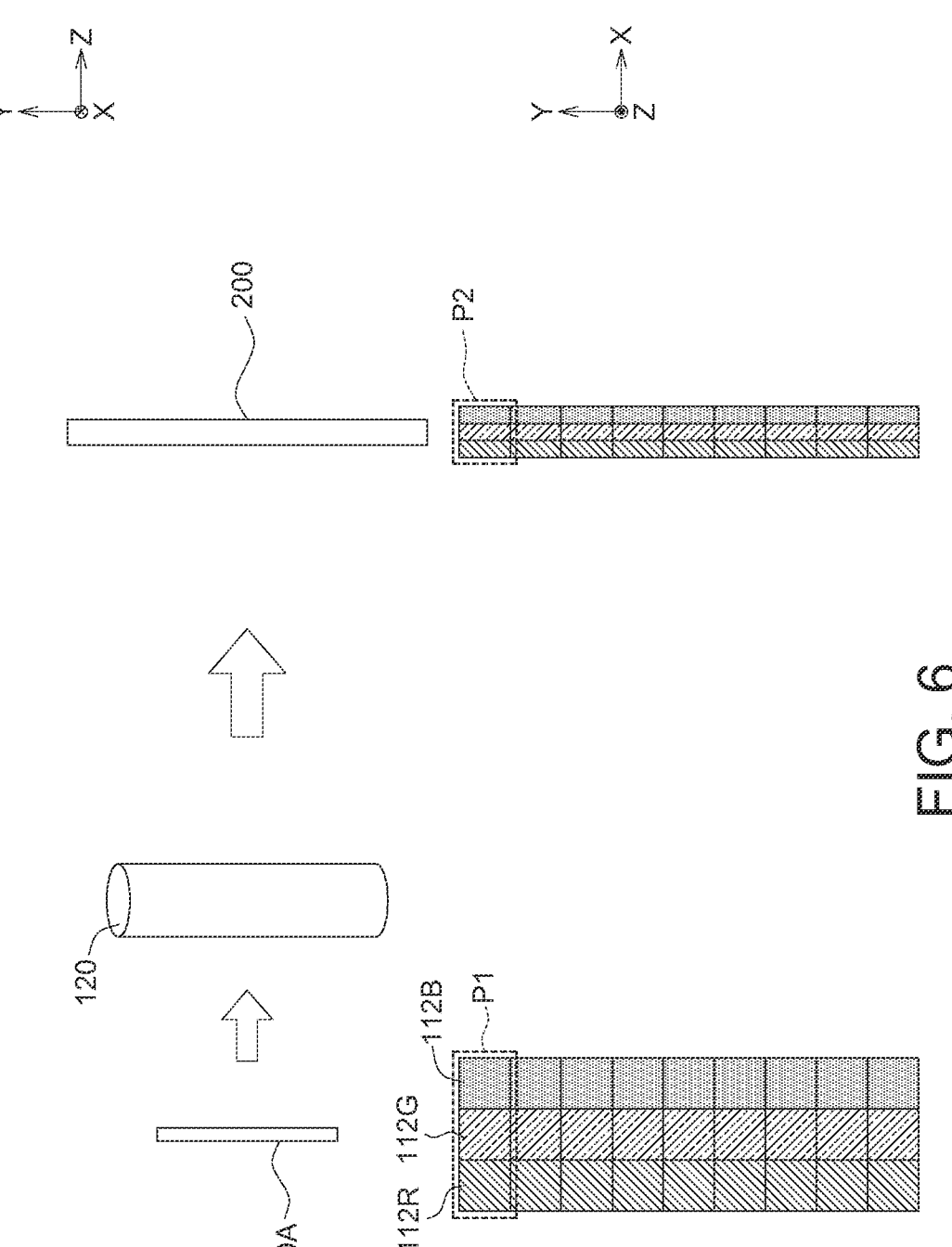

Referring back to FIGS. 1A-1C, the micro LED line 110 can extend in a vertical direction (Y direction in the drawings) and is arranged in a horizontal direction (X direction in the drawings). Referring also to FIG. 5, each micro LED line 110 can comprise a plurality of pixels P1. According to some embodiments, each of the pixels P1 comprises micro LEDs 112 of different colors, such as but not limited to a red micro LED 112R, a green micro LED 112G, and a blue micro LED 112B, and the pixels P1 are arranged in the vertical direction or the horizontal direction. Each of the pixels P1 has a length in the vertical direction and a width in the horizontal direction, and the length and the width are not equal. Each of the micro LEDs 112 has a length in the vertical direction and a width in the horizontal direction, and the width is larger than the length. Projected pixels P2 on the target projection plane 200 have a shape different from a shape of the corresponding pixels in the micro LED line 110. More specifically, the original pixels P1 elongated in the horizontal direction can be projected by the scan optical system 120 into the approximately square projected pixels P2. As such, compared with ordinary micro LEDs, the micro LEDs 112 of the disclosure can be enlarged at least in the horizontal direction, thereby alleviating the problems of low manufacturing efficiency, high process cost, and so on caused by the extremely small size of the micro LEDs. In FIG. 5, the red micro LED 112R, the green micro LED 112G, and the blue micro LED 112B are arranged in the vertical direction. FIG. 6 shows another example, in which the red micro LED 112R, the green micro LED 112G, and the blue micro LED 112B are arranged in the horizontal direction. Correspondingly, the shapes of the micro LEDs 112 and the pixels P1 are different for the projection into the approximately square projected pixels P2. Nevertheless, the micro LEDs 112 can also be enlarged in the horizontal direction, too, thereby alleviating the problems of caused by the extremely small size of the micro LEDs.

The scan optical system 120 scans the lights emitted from the micro LED line 110 and projects images formed of the lights to the corresponding positions on the target projection plane 200, as shown in FIG. 2. More specifically, the scan optical system 120 can project one by one the lights emitted from the micro LED line 110 at different times for forming one picture to different positions on the target projection plane 200. In other words, the scan optical system 120 projects an $i^{th}$ image formed of the lights to a position on the target projection plane 200 different from a position of an $(i-1)^{th}$ image on the target projection plane 200, wherein i≤X. In this way, N images I can be projected to form a complete picture on the target projection plane 200 even though the total number n of the at least one micro LED line 110 is smaller than the horizontal resolution N.

Figure 7:
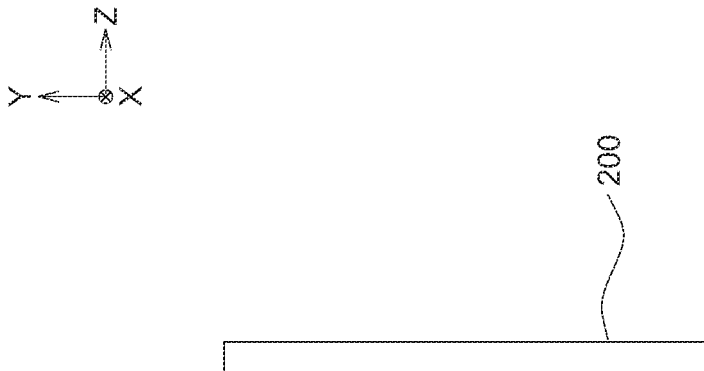
Figure 7:
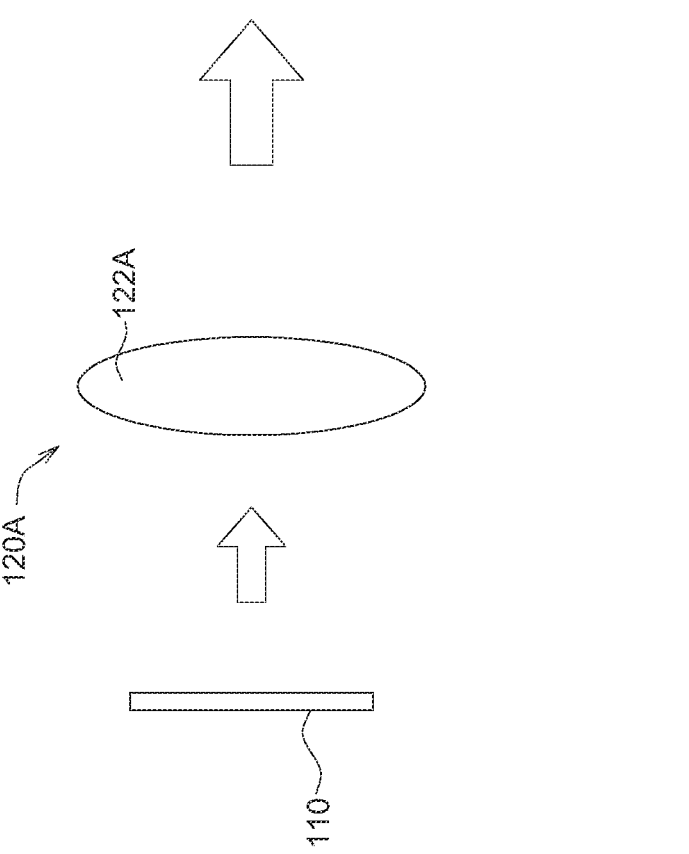
Figure 8:
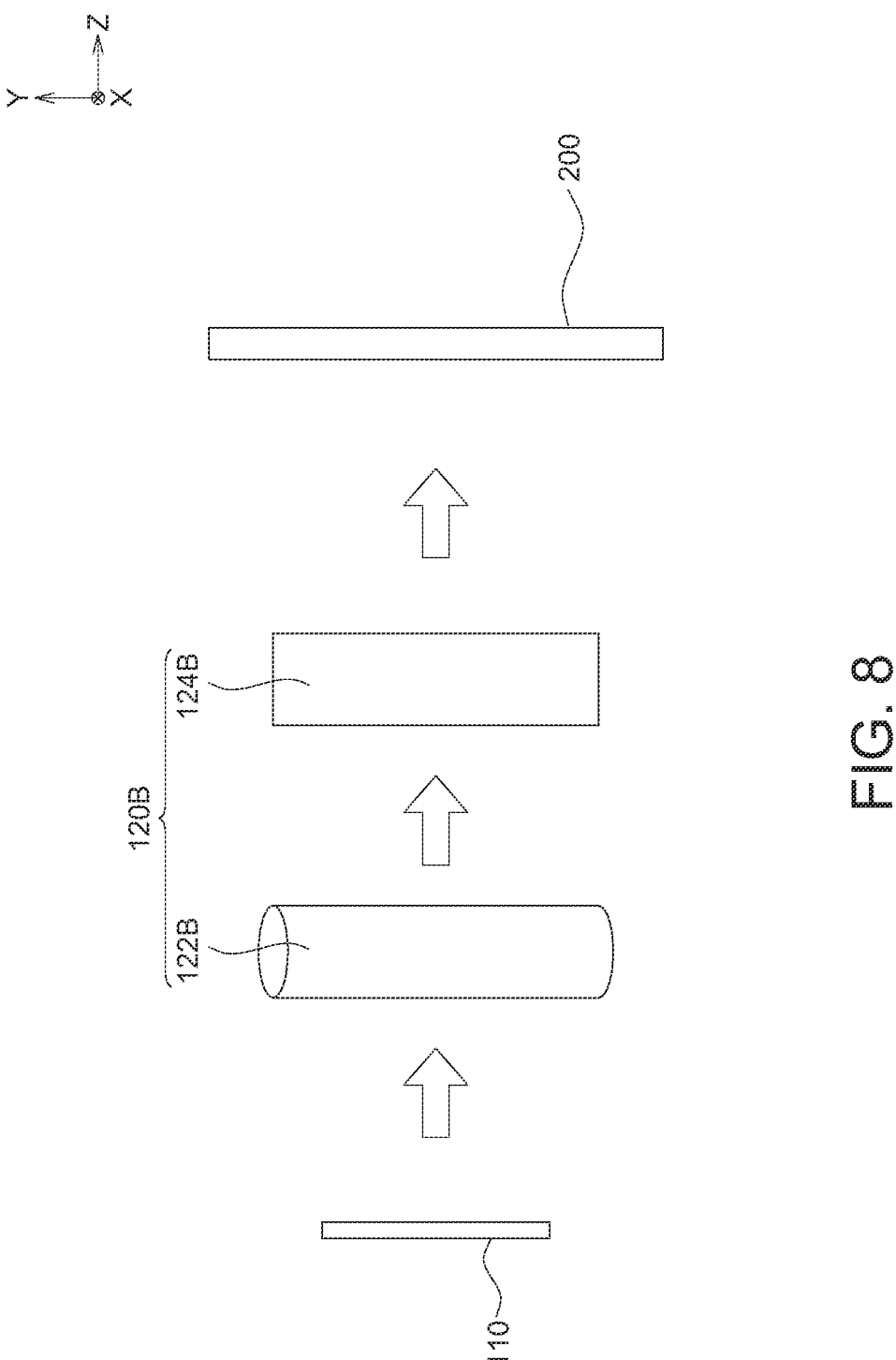

The scanning optical system 120 can comprise various kinds of lens or combinations thereof without particular limitation, as long as the purpose of the disclosure can be achieved, such as: a convex lens, a cylindrical lens, a concave lens, and combinations thereof; a mirror; and combinations thereof. In some embodiments, the scan optical system 120 can comprise a convex lens or a cylindrical lens. In some embodiments, the scan optical system 120 can further comprise a mirror. For example, the scan optical system 120 of FIGS. 1A-1C comprises a cylindrical lens 122. The cylindrical lens 122 can focus, scan, and project the lights emitted from the micro LED line 110. FIG. 7 shows another scan optical system 120A, which comprises a convex lens 122A. Similar to the cylindrical lens 122, the convex lens 122A can focus, scan, and project the lights emitted from the micro LED line 110. FIG. 8 shows still another scan optical system 120B, which comprises a cylindrical lens 122B and a mirror 124B. The cylindrical lens 122B is used to focus the lights emitted from the micro LED line 110, and the mirror 124B further scans and projects the lights. It is understood that other more complex combinations of lens (and mirror) can be used to form a scanning optical system in the disclosure, too.

According to some embodiments, at least one component of the scan optical system 120 is movable in the horizontal direction and/or rotatable around a rotation axis extending in a vertical direction. Action of the component can be driven and controlled by a control system 126, such as a mechanical system, a MEMS, a magnetic system, or a combination thereof. For example, FIG. 1C shows the rotation axis R of the cylindrical lens 122, and the rotation (also known as swing) is presented by an arrow A. It is understood that, while not shown in the drawings, the cylindrical lens 122 can be configured to move in the horizontal direction.

The projection system 100 can further comprise a scanning driver 130 coupled to the at least one micro LED line 110. The scanning driver 130 outputs driving signals at a signal frequency of X times per second to lighting the micro LED line 110. In some embodiments, as shown in FIG. 1B, the micro LED line 110 can be disposed on the scanning driver 130.

Based on the above content, a clear understanding to the projection system of the disclosure should be obtained. Now the disclosure is directed to details of a method of operating the projection system. The method comprises following steps. First, lights are emitted with at least one micro LED line of the projection system at a changing frequency of X times per second. Then, the lights emitted from the micro LED line are scanned with a scan rate of M seconds per scan and images formed of the lights are projected to corresponding positions on a target projection plane with a scan optical system of the projection system. The projection system has a horizontal resolution of N lines. A total number n of the at least one micro LED line is smaller than N. Also, X=M* (N/n).

In some embodiments, scanning the lights emitted from the micro LED line and projecting images formed of the lights to the corresponding positions on the target projection plane comprises focusing the lights with a convex lens or a cylindrical lens. In some embodiments, scanning the lights emitted from the micro LED line and projecting images formed of the lights to the corresponding positions on the target projection plane comprises scanning and projecting the lights with the convex lens or the cylindrical lens. In some embodiments, scanning the lights emitted from the micro LED line and projecting images formed of the lights to the corresponding positions on the target projection plane further comprises scanning and projecting the lights with a mirror. In some embodiments, scanning the lights emitted from the micro LED line comprises moving at least one component of the scan optical system in a horizontal direction and/or rotating at least one component of the scan optical system around a rotation axis extending in a vertical direction.

Figure 9A:
FIGS. 9A-9B to FIGS. 11A-11B illustrate operations of several exemplary projection systems of the disclosure.
Figure 9A:
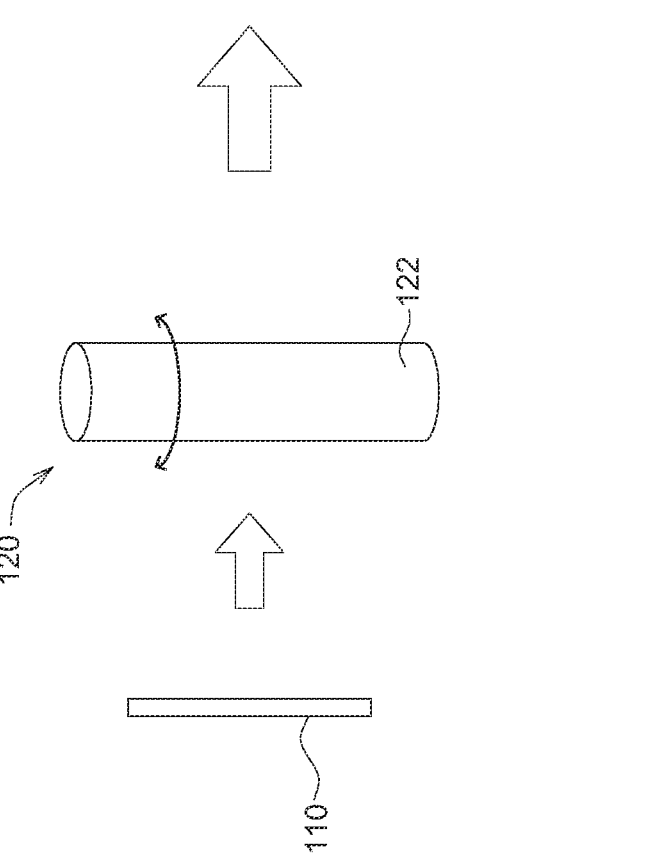
Figure 9B:
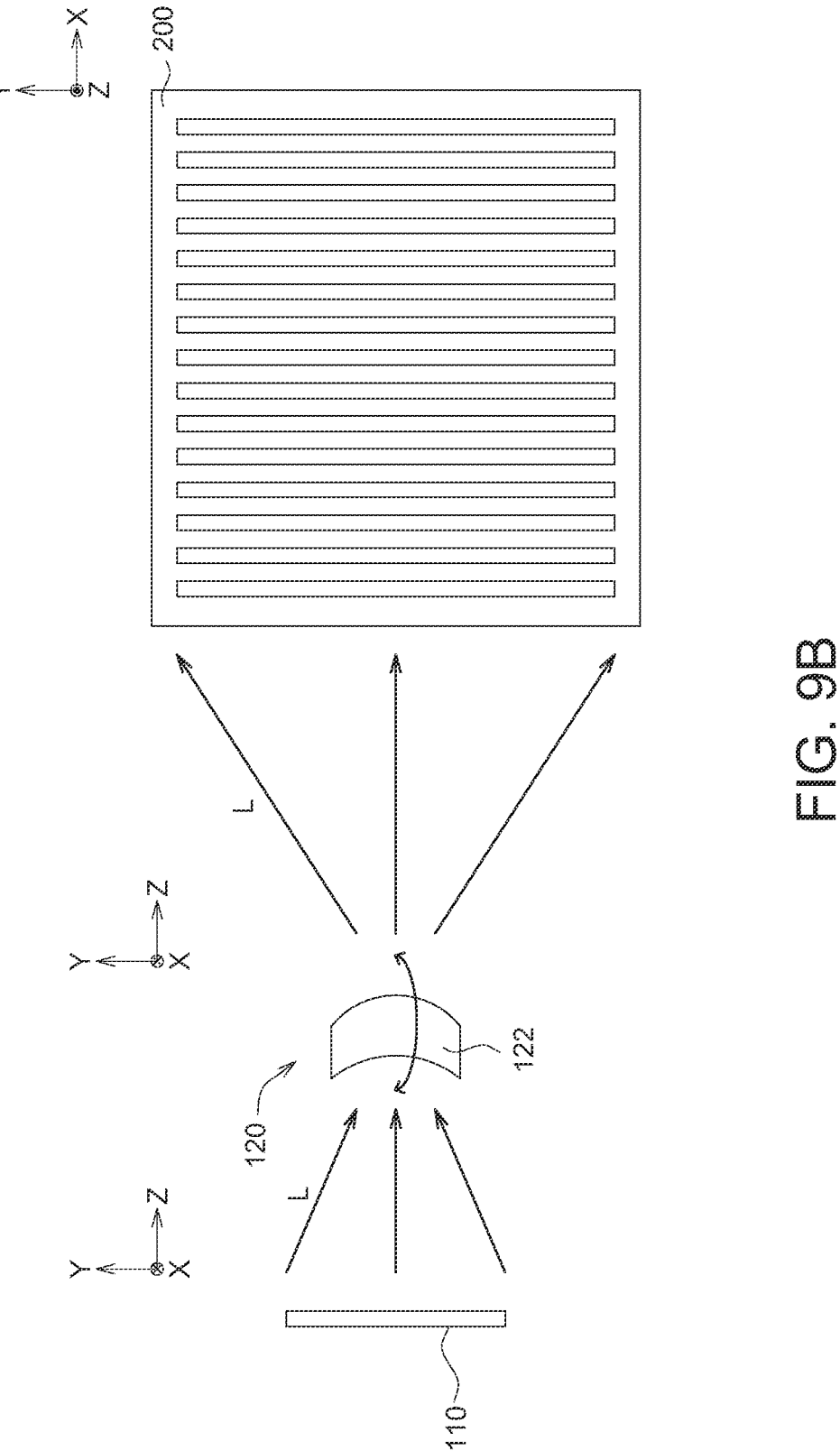
Figure 10A:
Figure 10A:
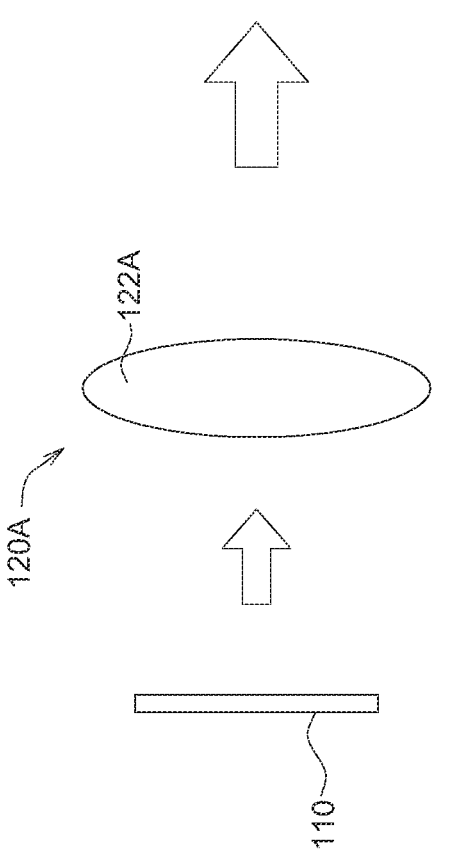
Figure 10B:
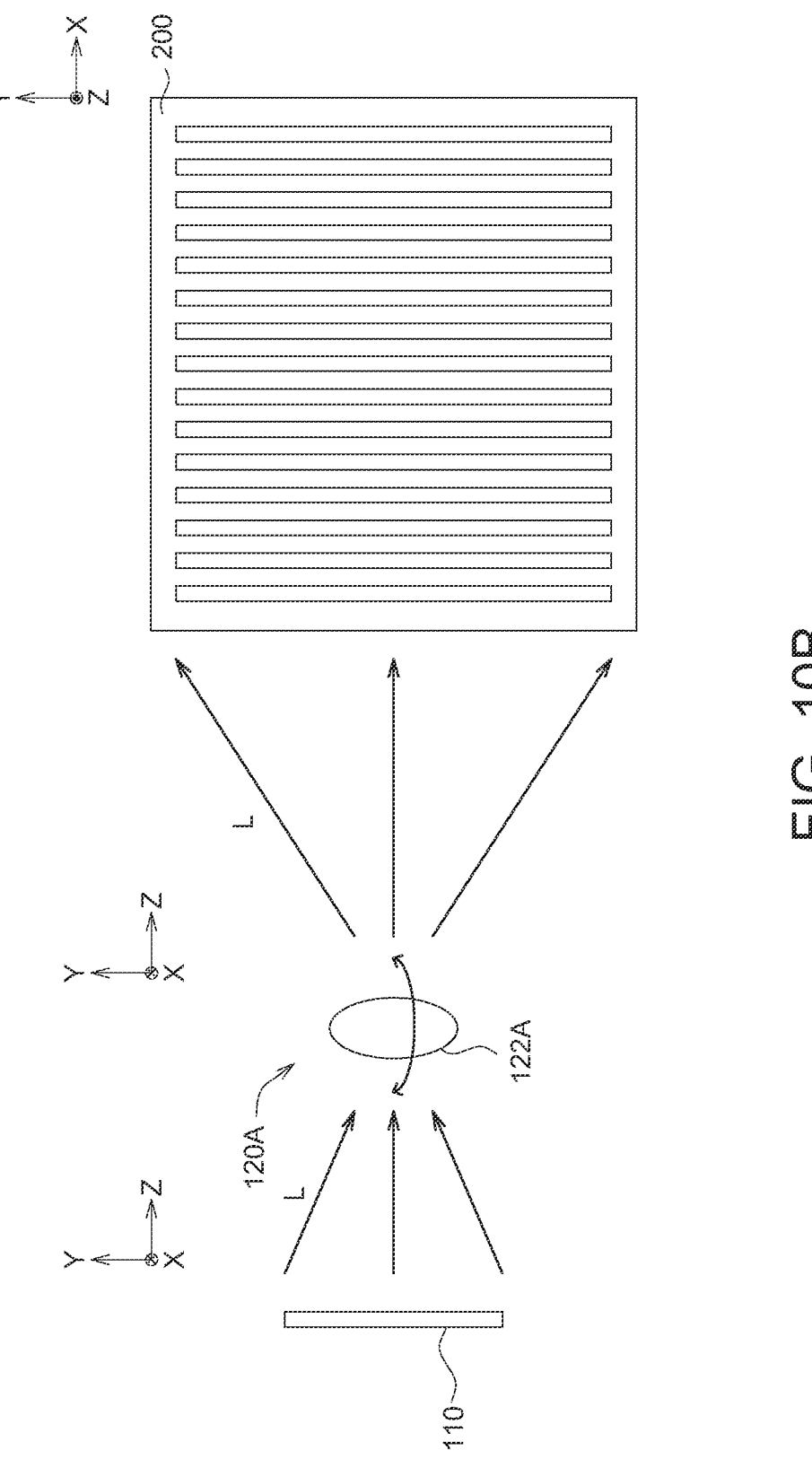
Figure 11A:
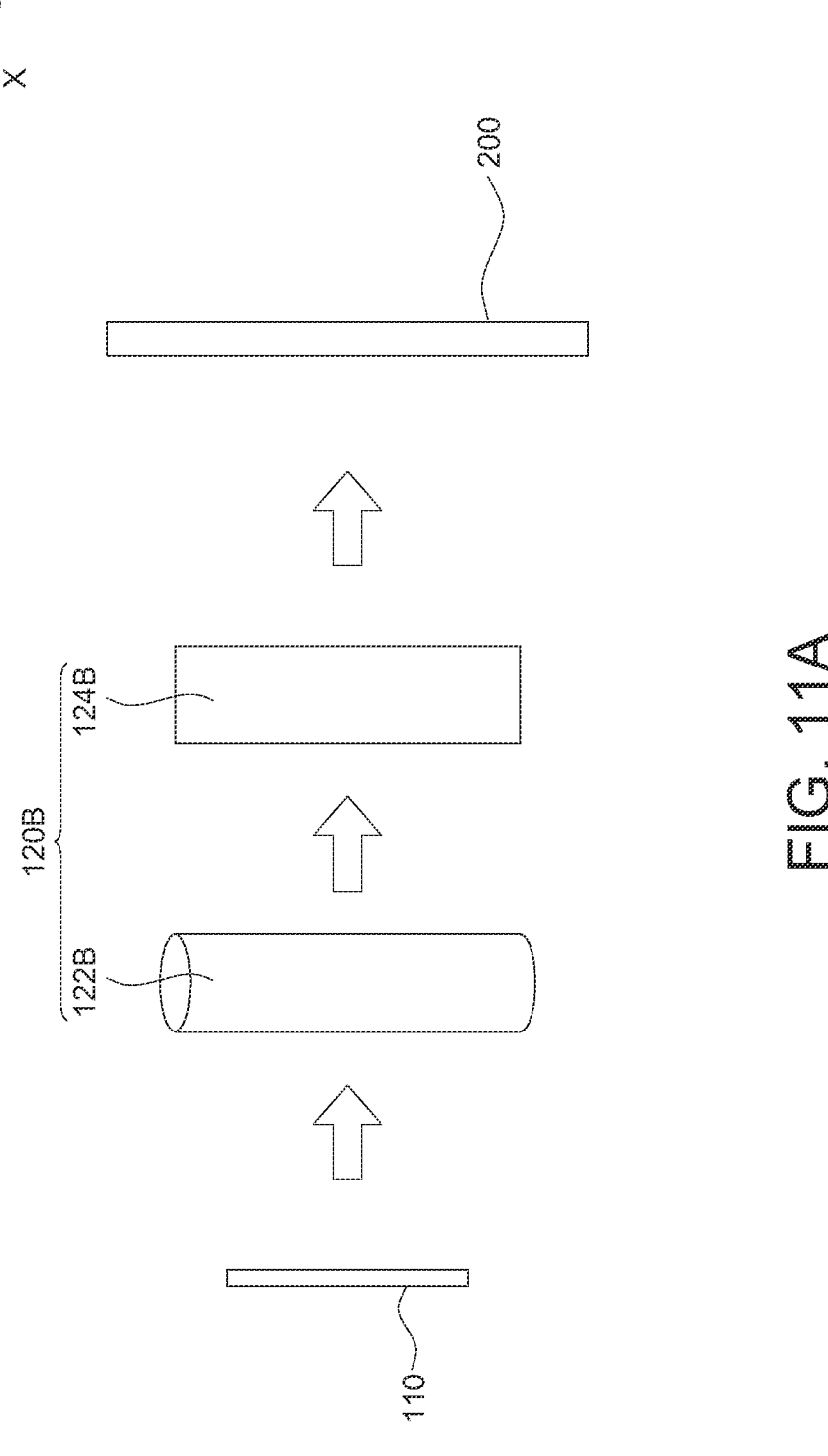
Figure 11B:
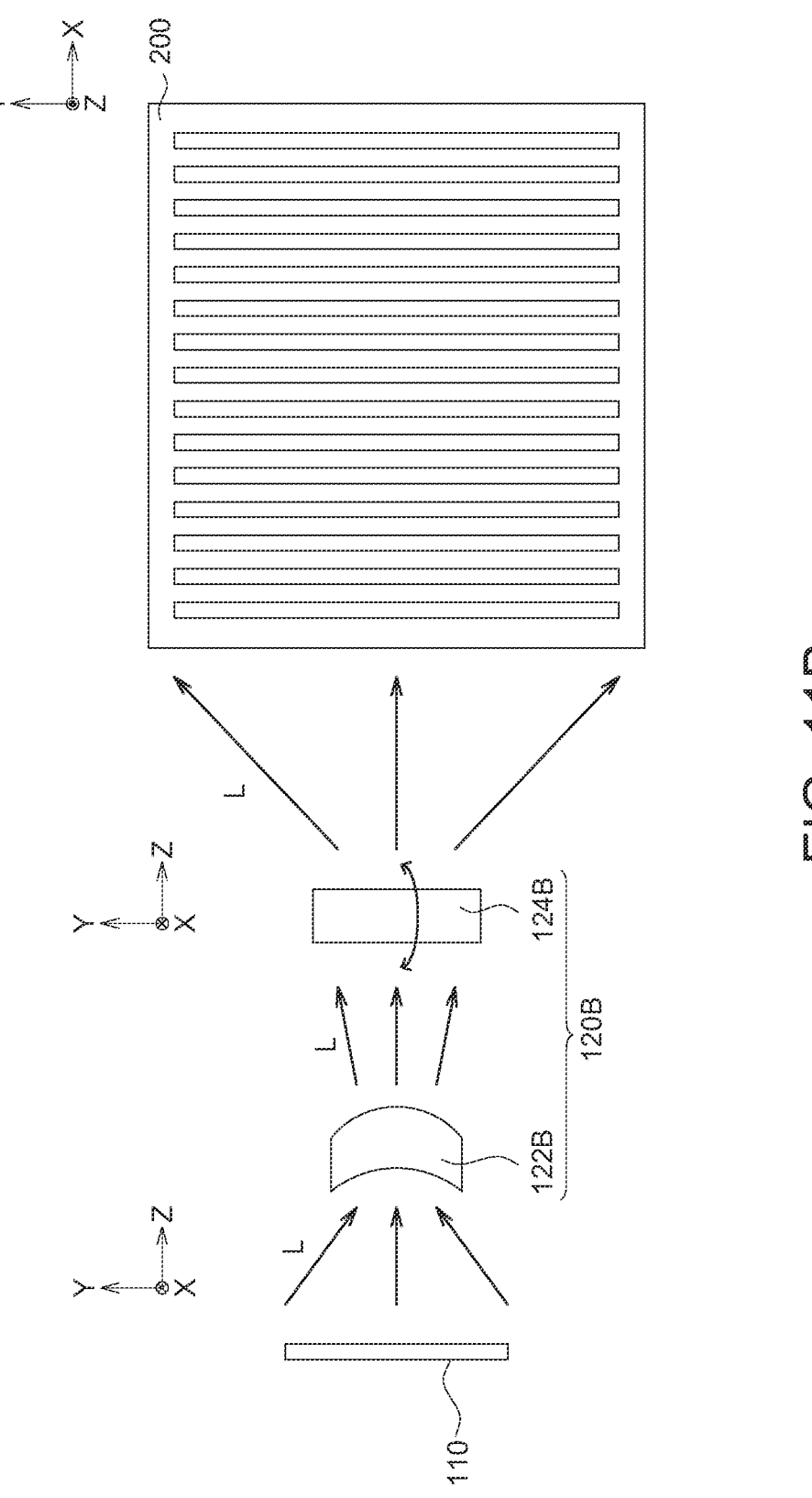

For example, referring to FIGS. 9A-9B, scanning and projection operations with the scan optical system 120 are illustrated. As shown in FIGS. 9A-9B, the micro LED line 110 emits lights L, and the cylindrical lens 122 is rotatable, thereby scanning and focusing the lights L emitted at each change of the micro LED line 110, and projecting one by one the lights L to the corresponding positions on the target projection plane 200 to form each picture. FIGS. 10A-10B illustrate scanning and projection operations with the scan optical system 120A. The convex lens 122A is rotatable, thereby scanning and focusing the lights L emitted at each change of the micro LED line 110, and projecting one by one the lights L to the corresponding positions on the target projection plane 200 to form each picture. FIGS. 11A-11B illustrate scanning and projection operations with the scan optical system 120B. The cylindrical lens 122B focuses the lights L emitted from the micro LED line 110. The mirror 124B is rotatable, thereby scanning the lights L, and projecting one by one the lights L to the corresponding positions on the target projection plane 200 to form each picture.

According to some embodiments, projecting images formed of the lights to the corresponding positions on the target projection plane can comprise forming projected pixels on the target projection plane such that the projected pixels have a shape different from a shape of corresponding pixels in the at least one micro LED line.

According to some embodiments, projecting images formed of the lights to the corresponding positions on the target projection plane can comprise projecting an $i^{th}$ image formed of the lights to a position on the target projection plane different from a position of an $(i-1)^{th}$ image on the target projection plane, wherein $i \leq X$.

In some embodiments, the method of the disclosure further comprises outputting driving signals from a scanning driver at a signal frequency of X times per second to the at least one micro LED line so as to light the at least one micro LED line.

In summary, the disclosure provides a projection system and a method of operating the same. In the projection system, lights corresponding to different positions on the target projection plane are emitted by at least one micro LED lines, whose number is less than the horizontal resolution, at different times, together with scanning and projection of a scan optical system for, forms a complete picture on the target projection plane. In such a condition, a large blank space can be left on at least one side of the micro LED line, and this facilitates replacement of a damaged micro LED line, or repair by placing a new micro LED line directly next to a damaged micro LED line. In addition, in the disclosure, larger micro LEDs (enlarged at least in the horizontal direction) can be used, thereby alleviating the problems of low manufacturing efficiency, high process cost, and so on caused by the extremely small size of the micro LEDs. The projection system and the method of operating the same of the disclosure can be applied in augmented reality (AR), virtual reality (VR), or mixed reality (MR), but not limited thereto.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A projection system, comprising:
   at least one micro LED line configured for emitting lights with a changing frequency of X times per second; and
   a scan optical system disposed at a downstream side of the at least one micro LED line, the scan optical system configured to scan the lights emitted from the at least one micro LED line with a scan rate of M seconds per scan and to project the lights emitted by the same one of the at least one micro LED line at different times to corresponding positions on a target projection plane for forming a picture on the target projection plane;
   wherein the projection system has a horizontal resolution of N lines;
   wherein a total number n of the at least one micro LED line is smaller than N; and $$X=M*(N/n).$$

2. The projection system according to claim 1, wherein the at least one micro LED line extends in a vertical direction and is arranged in a horizontal direction, each of the at least one micro LED line comprises a plurality of pixels, and each of the pixels comprises micro LEDs of different colors arranged in the vertical direction or the horizontal direction.

3. The projection system according to claim 2, wherein each of the pixels has a length in the vertical direction and a width in the horizontal direction, and the length and the width are not equal.

4. A projection system, comprising:
   at least one micro LED line configured for emitting lights with a changing frequency of X times per second; and
   a scan optical system disposed at a downstream side of the at least one micro LED line, the scan optical system configured to scan the lights emitted from the at least one micro LED line with a scan rate of M seconds per scan and to project images formed of the lights to corresponding positions on a target projection plane;
   wherein the projection system has a horizontal resolution of N lines;
   wherein a total number n of the at least one micro LED line is smaller than N; and $$X=M*(N/n);$$

wherein the at least one micro LED line extends in a vertical direction and is arranged in a horizontal direction, each of the at least one micro LED line comprises a plurality of pixels, and each of the pixels comprises micro LEDs of different colors arranged in the vertical direction or the horizontal direction; and
   each of the micro LEDs has a length in the vertical direction and a width in the horizontal direction, and the width is larger than the length.

5. The projection system according to claim 2, wherein projected pixels on the target projection plane have a shape different from a shape of the corresponding pixels in the at least one micro LED line.

6. The projection system according to claim 1, wherein the scan optical system projects an $i^{th}$ image formed of the lights to a position on the target projection plane different from a position of an $(i-1)^{th}$ image on the target projection plane, wherein $i \leq X$.

7. The projection system according to claim 1, wherein the scan optical system comprises a convex lens or a cylindrical lens.

8. The projection system according to claim 7, wherein the scan optical system further comprises a mirror.

9. The projection system according to claim 1, wherein at least one component of the scan optical system is movable in a horizontal direction and/or rotatable around a rotation axis extending in a vertical direction.

10. The projection system according to claim 9, wherein action of the component is driven and controlled by a mechanical system, a MEMS, a magnetic system, or a combination thereof.

11. The projection system according to claim 1, further comprising:

a scanning driver coupled to the at least one micro LED line, the scanning driver outputting driving signals at a signal frequency of X times per second to lighting the at least one micro LED line.

12. A method of operating a projection system, comprising:

emitting lights with at least one micro LED line of the projection system at a changing frequency of X times per second; and scanning the lights emitted from the at least one micro LED line with a scan rate of M seconds per scan and projecting the lights emitted by the same one of the at least one micro LED line at different times to corresponding positions on a target projection plane with a scan optical system of the projection system for forming a picture on the target projection plane;

wherein the projection system has a horizontal resolution of N lines;

wherein a total number n of the at least one micro LED line is smaller than N; and $X=M*(N/n)$.

13. The method according to claim 12, wherein scanning the lights emitted from the at least one micro LED line and projecting the lights to the corresponding positions on the target projection plane comprises focusing the lights with a convex lens or a cylindrical lens.

14. The method according to claim 13, wherein scanning the lights emitted from the at least one micro LED line and projecting the lights to the corresponding positions on the target projection plane comprises scanning and projecting the lights with the convex lens or the cylindrical lens.

15. The method according to claim 13, wherein scanning the lights emitted from the at least one micro LED line and projecting the lights to the corresponding positions on the target projection plane further comprises scanning and projecting the lights with a mirror.

16. The method according to claim 12, wherein scanning the lights emitted from the at least one micro LED line comprises moving at least one component of the scan optical system in a horizontal direction and/or rotating at least one component of the scan optical system around a rotation axis extending in a vertical direction.

17. The method according to claim 12, wherein projecting the lights to the corresponding positions on the target projection plane comprises forming projected pixels on the target projection plane such that the projected pixels have a shape different from a shape of corresponding pixels in the at least one micro LED line.

18. The method according to claim 12, wherein projecting the lights to the corresponding positions on the target projection plane comprises projecting an $i^{th}$ image formed of the lights to a position on the target projection plane different from a position of an $(i-1)^{th}$ image on the target projection plane, wherein $i \leq X$.

19. The method according to claim 12, further comprising:

outputting driving signals from a scanning driver at a signal frequency of X times per second to the at least one micro LED line so as to light the at least one micro LED line.

\* \* \* \* \*